March 18, 1952    F. A. PETRAGLIA    2,589,509
SOLDERING IRON
Filed May 14, 1948

INVENTOR
FRANK A. PETRAGLIA
BY Robert Levine
ATTORNEY

Patented Mar. 18, 1952

2,589,509

UNITED STATES PATENT OFFICE 2,589,509

SOLDERING IRON

Frank A. Petraglia, New York, N. Y.

Application May 14, 1948, Serial No. 27,050

2 Claims. (Cl. 158—24)

This invention relates generally to heating appliances or tools and more specifically to those instrumentalities which are used to focus or direct exceedingly great quantities of heat to a predetermined point for soldering purposes. Thus, the preferred embodiment of the present invention, as herein described, is shown as being directed toward a soldering iron or tool, although the uses of the many features disclosed therein are in nowise thus limited.

Presently known soldering irons must obtain their heat in an indirect manner, as for example, by being heated over a torch or flame, as in the plumbing or electrical trades, or where available, from an electrical generating source, as is done by electrical soldering irons.

The need for a soldering tool which obviates the necessity for utilizing an external heat generating source to provide the thermal and caloric requirements for performing a proper soldering operation, has ever been great. The present invention provides such a tool. By the present invention, there is disclosed a soldering iron which self-contains its own heat generating plant without need for an electrical or external heat generating source. This is done by providing in the soldering iron itself a heat generating system.

It is, therefore, a prime object of the present invention to provide a simple and efficient soldering iron which does not require an external heat source.

Still another object of the present invention is to provide a soldering iron which contains its own heat generating plant.

Yet another object of the present invention is to provide a soldering iron having a portable heat generating source.

Still another object of the present invention is to provide a soldering iron for use in close, cramped or confined quarters and wherever the ordinary soldering iron cannot be readily used.

A further object of the present invention is to provide a simple soldering iron having a local heat generating source utilizing a chemical reaction to provide said heat.

Still another object of the present invention is to provide a refillable local heat generating source capable of establishing the necessary heat requirements to give an efficient soldered or joined connection.

The invention in another of its aspects relates to novel features of the instrumentalities described herein for achieving the principal objects of the invention and to novel principles employed in those instrumentalities, whether or not these features and principles are used for the said principal objects or in the said field.

Figure 1:
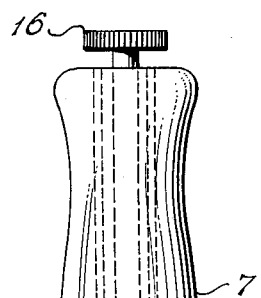
Figure 2:
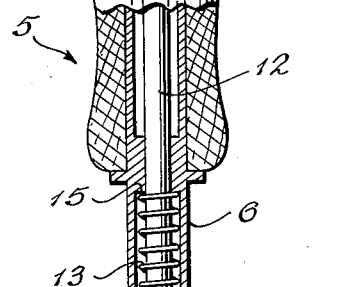
Figure 2:
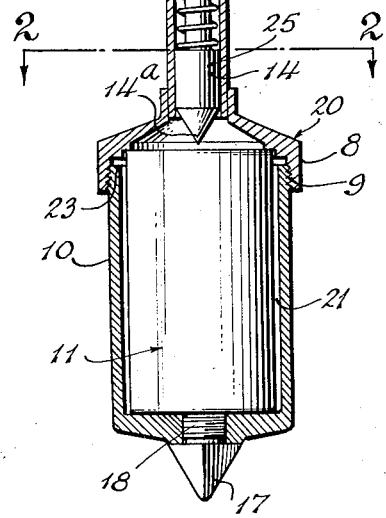

Further objects and advantages of the present invention will become apparent from the following specification and drawings, in which, Fig. 1 is an illustrative showing of a preferred embodiment of the improved soldering iron utilizing a heating cartridge as a local generating source, and having portions thereof showing in cross section; and Fig. 2 is a cross section view of a portion of the preferred embodiment of the invention as taken along line 2—2 of Fig. 1.

As stated, the present invention provides a self-contained and local heat generating soldering iron which obviates the necessity for external heat generating sources. Thus, there is provided a tool for use in closely confined areas and wherever external heat generating sources are not readily available. For example, the present invention has great utility when used in extremely dangerous environments, such as are usual during the repair of overhead telephone cables and wires or on board ship or where emergency heat sources are not readily available.

Essentially the novel tool hereinafter described includes as a tip member, a hollow cylindrical chamber into which a heat generating cartridge may be inserted. The heat cartridge is discharged in a suitable manner as by firing a plunger having a penetrating pin. After use, the cartridge may be emptied from the chamber, opened, and refilled to be made ready for the next heating operation.

Figs. 1 and 2 are illustrative representations of a preferred embodiment of the soldering iron 5 which contains its own heat generating mechanism. Soldering iron 5 has a gripping handle 7 made of a suitable heat resistant material, such as wood or plastic, wherein a firing plunger 16 may be transported. It includes a rod section 12 and a contact pin 25 comprising a cylindrical base 14 and a sharply tapered tip 14a at its end.

For supplying ease of movement to plunger 16, a spring 13 is wound about rod section 12 at a lower portion thereof between a stop 15 and base 14. Spring 13 and the lower section of rod 12 are in turn circumscribed by an annular shell 6. Soldering tip 20 of soldering iron 5 comprises a cartridge chamber 21 formed as by a cylindrical shell 10 having a top 23 open-ended and threaded as by means of threads 9. About the top 23 is a cap portion 8 which screwably joins chamber 21 to annular shell 6. Within chamber 21 there is inserted a heat generating cartridge 11, which is capable of producing, on discharge or firing, great quantities of concentrated heat which may be conducted to a desired focus as by means of screw 18 and tip 17.

The operation of the soldering iron is seen to be rapid and efficient. A heat producing cartridge 11 is inserted in chamber 10 whenever desired. Plunger 16 is then tapped so that tip 14 punctures cartridge 11, whereupon the desired quantum of heat is generated for heating the soldering tip 17.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A soldering iron comprising a gripping handle of suitable heat resistant material, said handle having a bore therethrough, means for containing a cartridge having heat generating materials for use in soldering comprising, a threaded cylindrical hollow chamber having a top portion, a tapered soldering tip portion for focusing said generated heat developed in said means and being connected thereto, a threaded cap situated on said top portion opposite said tip portion for engaging and closing said top portion, said cap having a bore therethrough and accommodating said firing pin, hollow means connecting said gripping handle with said cap, and a plunger slidably mounted within said handle and connecting means, a contact pin on said plunger and slidable through the bore in said cap, spring means mounted between said contact pin and the upper portion of said connecting means, said plunger being retractable against said spring and upon release adapted to puncture said containing means, said tip, cap and handle all being axially aligned.

2. A soldering iron comprising a gripping handle of suitable heat resistant material, said handle having a bore therethrough, means for containing a cartridge having heat generating materials for use in soldering comprising, a threaded cylindrical hollow chamber having a top portion, a tapered soldering tip portion for focusing said generated heat developed in said means and being connected thereto, a threaded cap situated on said top portion opposite said tip portion for engaging and closing said top portion, said cap having a bore therethrough and accommodating said firing pin, hollow means connecting said gripping handle with said cap, and a plunger slidably mounted within said handle and connecting means, a contact pin on said plunger and slidable through the bore in said cap, spring means mounted within said connecting means between said contact pin and the upper portion of said connecting means, said plunger being retractable against said spring and upon release adapted to puncture said containing means, said tip, cap and handle all being axially aligned.

FRANK A. PETRAGLIA.

REFERENCES CITED

The following references are of record in the file of this patent:

UNITED STATES PATENTS

| Number | Name | Date |
|---|---|---|
| 712,938 | Kaufman | Nov. 4, 1902 |
| 761,010 | Rogers | May 24, 1904 |
| 820,638 | Gabriel | May 15, 1906 |
| 1,160,343 | Tomaszewski | Nov. 16, 1915 |
| 1,172,405 | Szotak | Feb. 22, 1916 |
| 1,573,872 | Schwartz | Feb. 23, 1926 |
| 1,602,266 | Jarkovsky | Oct. 5, 1926 |
| 1,826,562 | Minto | Oct. 6, 1931 |
| 1,838,357 | Bottrill | Dec. 29, 1931 |
| 1,928,129 | Hornack | Sept. 26, 1933 |
| 2,182,636 | Lackenbach | Dec. 5, 1939 |
| 2,289,008 | Gessler | July 7, 1942 |

FOREIGN PATENTS

| Number | Country | Date |
|---|---|---|
| 533,039 | France | Nov. 28, 1921 |
| 209,479 | Great Britain | Jan. 9, 1924 |
| 587,496 | Great Britain | Apr. 28, 1947 |